United States Patent [19]

Edmonds

[11] Patent Number: 4,749,209
[45] Date of Patent: Jun. 7, 1988

[54] COLLAPSIBLE FISHING GEAR AND LOAD BEARING CARRIAGE

[76] Inventor: Willie L. Edmonds, 608 Chestnut St., Franklin, Va. 23851

[21] Appl. No.: 120,919

[22] Filed: Nov. 16, 1987

[51] Int. Cl.⁴ .............................................. B62B 1/04
[52] U.S. Cl. ...................................... 280/652; 280/30; 280/47.18; 280/47.19; 280/655; 297/118; 297/129; 297/193
[58] Field of Search ................. 280/30, 651, 652, 655, 280/659, 47.18, 57.19, 47.24, 47.26, 47.33; 297/118, 129, 183, 193, 378

[56] References Cited

U.S. PATENT DOCUMENTS

| | | | |
|---|---|---|---|
| 2,419,422 | 4/1947 | Schulein | 280/651 |
| 3,014,760 | 12/1961 | Gard | 297/192 |
| 3,930,662 | 1/1976 | Manner | 280/652 |
| 4,355,818 | 10/1982 | Watts | 280/47.19 |
| 4,448,434 | 5/1984 | Anderson | 280/655 |
| 4,460,188 | 7/1984 | Maloof | 280/30 |
| 4,603,879 | 8/1986 | Morrissette | 280/655 |

FOREIGN PATENT DOCUMENTS 810882  3/1959  United Kingdom ............... 280/651

Primary Examiner—John J. Love
Assistant Examiner—Eric D. Culbreth
Attorney, Agent, or Firm—J. Gibson Semmes

[57] ABSTRACT

Collapsible fishing gear and load bearing carriage having a reinforced cycle frame upon which are mounted an articulated handle and seat joined together, also having a carton and the like storage area as well as implement securing elements. The carriage is supported both for mobility and stationary sporting utility, and in the latter mode its utility components are balance mounted, relative to three ground engaging supports.

1 Claim, 1 Drawing Sheet

COLLAPSIBLE FISHING GEAR AND LOAD BEARING CARRIAGE

BACKGROUND OF INVENTION

The invention is a combination collapsible carriage for fishing gear and seating as well as being convertible to a load bearing unit, suitable for shopping, gardening and the like. It is related to the prior developments of Jon I. Gard, U.S. Pat. No. 3,014,760; Thomas B. Manner U.S. Pat. No. 3,930,662; John J. Maloof U.S. Pat. No. 4,460,188. It is distinguishable thereover in that it is more suitable for a simultaneous load bearing characteristic and seat rest than one may find in the prior art. This collapsible carriage of the present invention not only serves the function of securing game rods and a conventional cooler but also in its convertible function, it forms an appropriate seat for the fisherman, once he has reached his shoreline. When not in use as a fishing tackle and fishing seat support, it is likewise handy as a means of carrying gardening tools, and related implements, as well as substantial packaging in the form of cartons and the like.

SUMMARY OF THE INVENTION

The present invention consists of a wheeled carriage with a permanent front support which is mounted a chassis, the chassis bearing the elements which together form tool or rod holders, cross-bracing for load support and an optional seat, otherwise known as a fishing tackle area.

DETAILED DESCRIPTION OF PREFERRED EMBODIMENT

Figure 1:
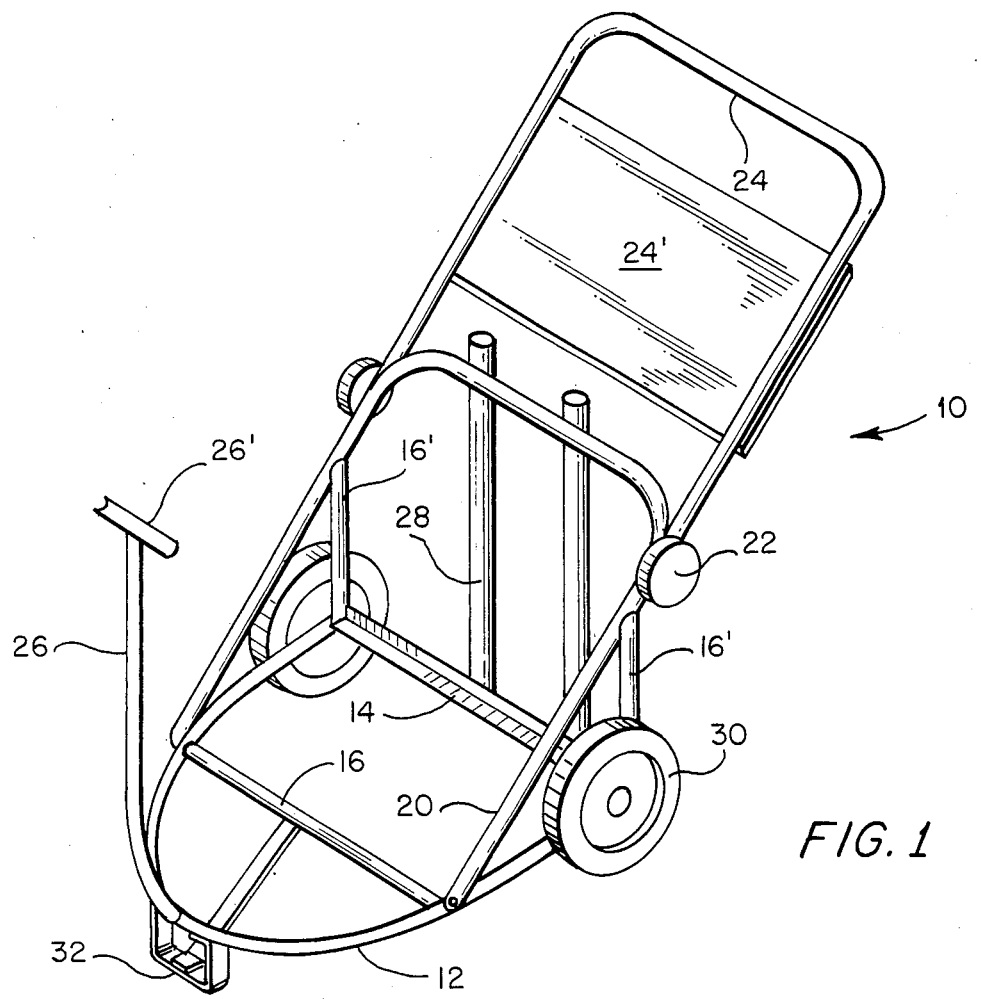
FIG. 1 is a view in perspective of invention, illustrating its utility as a carriage or cart.

The convertible load bearing carriage 10 comprises an external substantially triangular frame or chassis 12, bowed at its forefront. An angle iron 14 is axially disposed at its rear to rigidize it. There is a cross-bracing and a container support 16, fixed to the chassis between ends thereof. As indicated, cross-bracing 16 secures to corresponding inclined frame member 20 at the lateral junctions of the cross-bracing and chassis 12. Uprights 16' serve as vertical stabilizers, the same engaging the rear axial support 14 and the extension 20 in stabilizing fixed relation thereto. Extending upwardly from the frame member extension 20 is the articulated draw handle 24 and seat member 24'. The handle 24 is detent hinged to the extension 20 as at 22, wherein its upright position is secured in the travel mode (FIG. 1).

Figure 2:
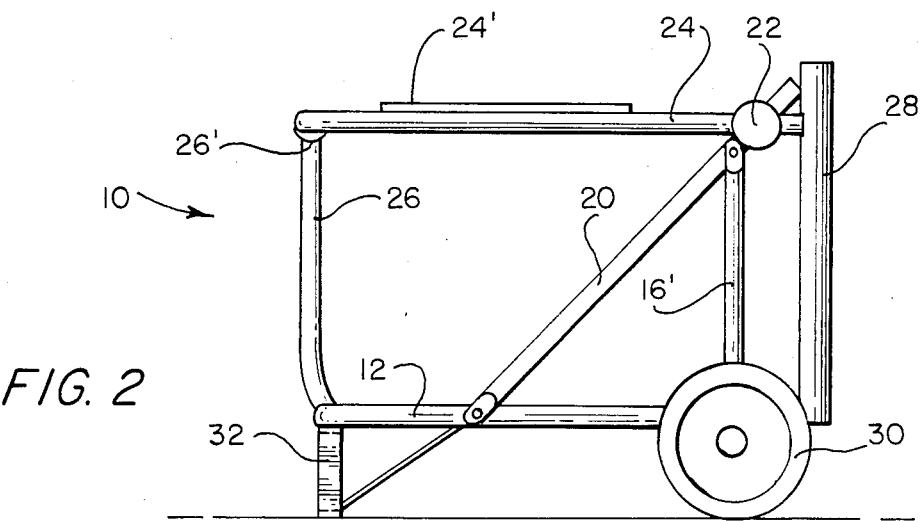
FIG. 2 is a view in side elevation of the FIG. 1 configuration, showing the invention in a sport utility mode.

In the utility mode, FIG. 2, the combination handle 24 and seat 24' are depressed arcuately to rest upon the upright support 26 and its cradle 26'. Here, also the game rod retainers 28 are cleared at the top for facile rod or implement storage, leaving an appropriate forward well upon which to rest a cooler in sporting activity or to secure cartons in support of garden or shopping activities.

The carriage 10 is dolly supported by wheels 30 and forward stanchion 32, the latter having strict connection to the cross-bracing 16. Of significance is the disposition of the implement retainer 28 and the well and seat combination, relative to the fixed and rolling elements 32 and 30.

I claim:
1. A collapsible fishing gear and load bearing carriage comprising:
   (A) An elongate frame bowed at its forward end and terminated at the rear end by an angle-iron, which is transversely disposed relative to the rearward end of the frame;
   (B) cross-bracing intermediate ends of the frame and;
   (C) a reinforcing extension, engaging the frame at the cross-bracing and extending angularly rearward of the frame, the extension having vertical bracing extending upward from the angle-iron;
   (D) an articulated handle, pivoted to the reinforcing extension, the handle defining a seat which with the handle may be set in vertical spaced relation to the frame;
   (E) an upright handle support and cradle mounted in upright relation to the forward end of the frame to engage the handle upon arcuate displacement of the handle;
   (F) plural implement retainers secured respectively to the angle-iron and the reinforcing extension; and
   (G) carriage wheels at transverse extremities of the frame and means on the forward end of the frame to support a load thereon.

* * * * *